United States Patent [19]
Thoden et al.

[11] 3,924,948
[45] Dec. 9, 1975

[54] DENSITOMETER FOR USE IN QUANTITATIVE THIN LAYER CHROMATOGRAPHIC ANALYSIS

[75] Inventors: John Thoden, Vineland; Theodore Wagner, Mantua, both of N.J.

[73] Assignee: Kontes Glass Company, Vineland, N.J.

[22] Filed: Dec. 17, 1973

[21] Appl. No.: 425,513

[52] U.S. Cl. .................. 356/71; 250/227; 250/559; 250/571; 356/186; 356/201; 356/203; 356/209
[51] Int. Cl.² ...................... G06K 9/08; G01J 3/48
[58] Field of Search ....... 356/51, 73, 186, 201, 202, 356/203, 209, 210, 211, 212, 226, 244; 250/227, 559, 571

[56] References Cited
UNITED STATES PATENTS

| | | | |
|---|---|---|---|
| 2,406,716 | 8/1946 | Sweet | 356/226 |
| 3,208,265 | 9/1965 | Rutledge | 356/201 |
| 3,406,290 | 10/1968 | Brueschke | 250/227 |
| 3,462,225 | 8/1969 | Bayha | 356/244 |
| 3,473,878 | 10/1969 | Schweitzer | 356/209 |
| 3,480,786 | 11/1969 | Kottman | 356/203 |
| 3,600,099 | 8/1971 | Schoeffel | 356/244 |
| 3,712,745 | 1/1973 | Armstrong, Jr. et al. | 356/244 |
| 3,734,630 | 5/1973 | McIntosh et al. | 356/212 |
| 3,762,817 | 10/1973 | Harklau | 356/73 |

Primary Examiner—Vincent P. McGraw

[57] ABSTRACT

A densitometer for use in quantitative analysis of spots on a thin layer chromographic plate includes a movable plate support to permit scanning of the plate by a head assembly positioned above the support. For reflectance mode operation the head assembly contains a source of visible light for illuminating the plate with light which is subsequently reflected by the plate back towards the head assembly. For transmittance mode operation a source of ultraviolet light is situated below the support. The support is provided with a frame portion for contacting only the peripheries of the plate and an opened portion aligned with the spotted areas of the plate such that the spotted areas of the plate may be exposed to light from below by the ultraviolet light source during transmittance mode operation. Exposure to ultraviolet light causes the spots on a properly prepared plate to fluoresce thus emitting visible light. In both operational modes the light from the plate is detected by a sensing means located in the head assembly. The active portion of the head assembly is vertically movable by means of a solenoid between an operational position adjacent the plate and a position remote therefrom. In order to prevent head damage, the active portion is automatically moved to its remote position when the power to the densitometer is removed. In order to eliminate output transients from the sensing means due to vertical movement of the head assembly, the sensing means is energized only when the head assembly is in the operational position. The sensing means circuitry drives a balance meter and incorporates a damping circuit which regulates the meter sensitivity to make the meter less sensitive at the peripheries of the meter range. The head positioning solenoid is provided with a high voltage transient pulse generating circuit to enhance the efficiency thereof. Spring-loaded plate hold-down means are provided to releasably secure the plate to the support and the head assembly is provided with a pointer extending therefrom to identify the spotted area being scanned.

35 Claims, 13 Drawing Figures

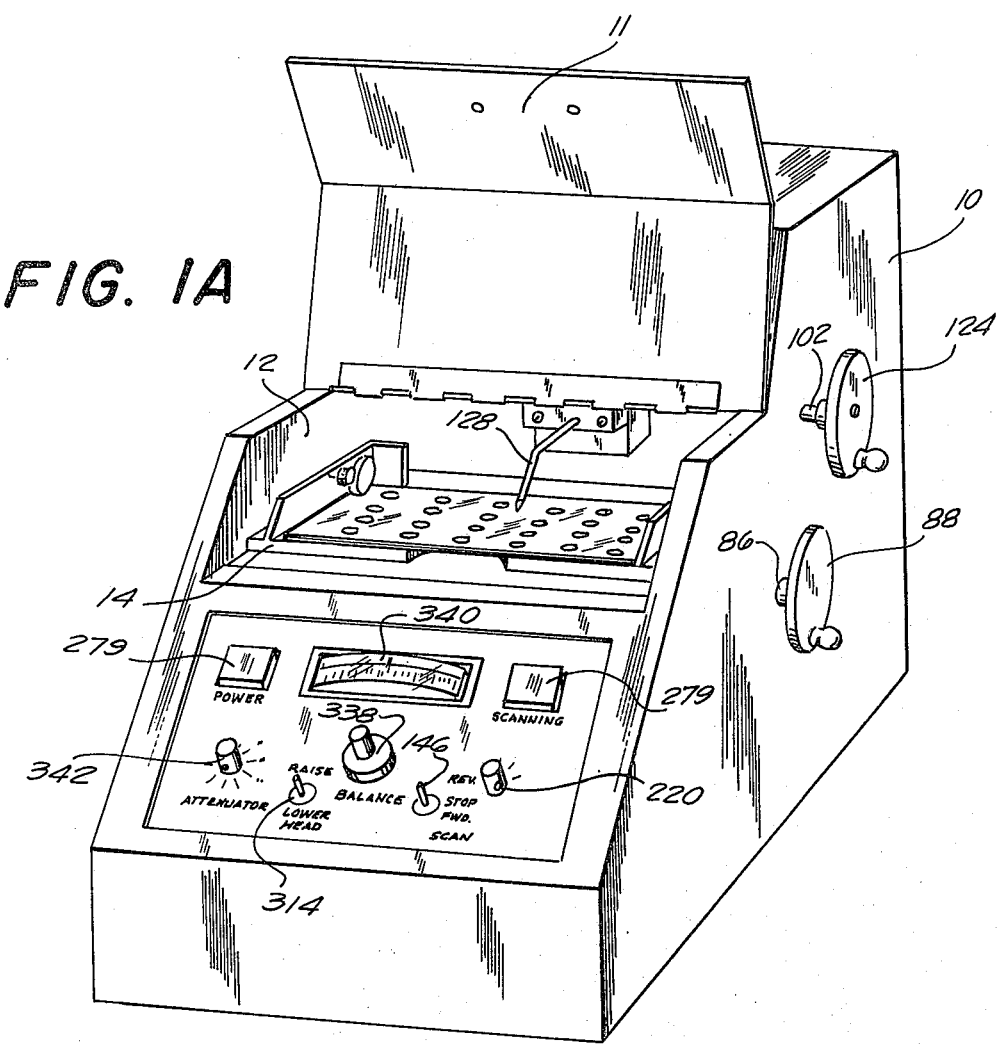
FIG. IA
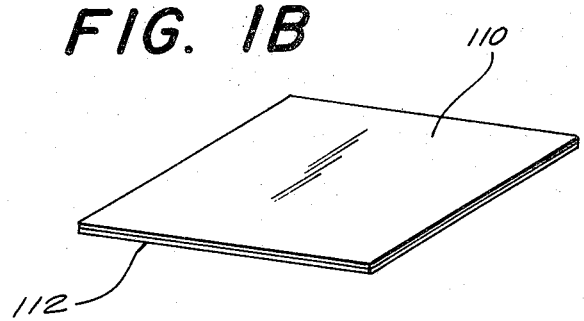
FIG. IB

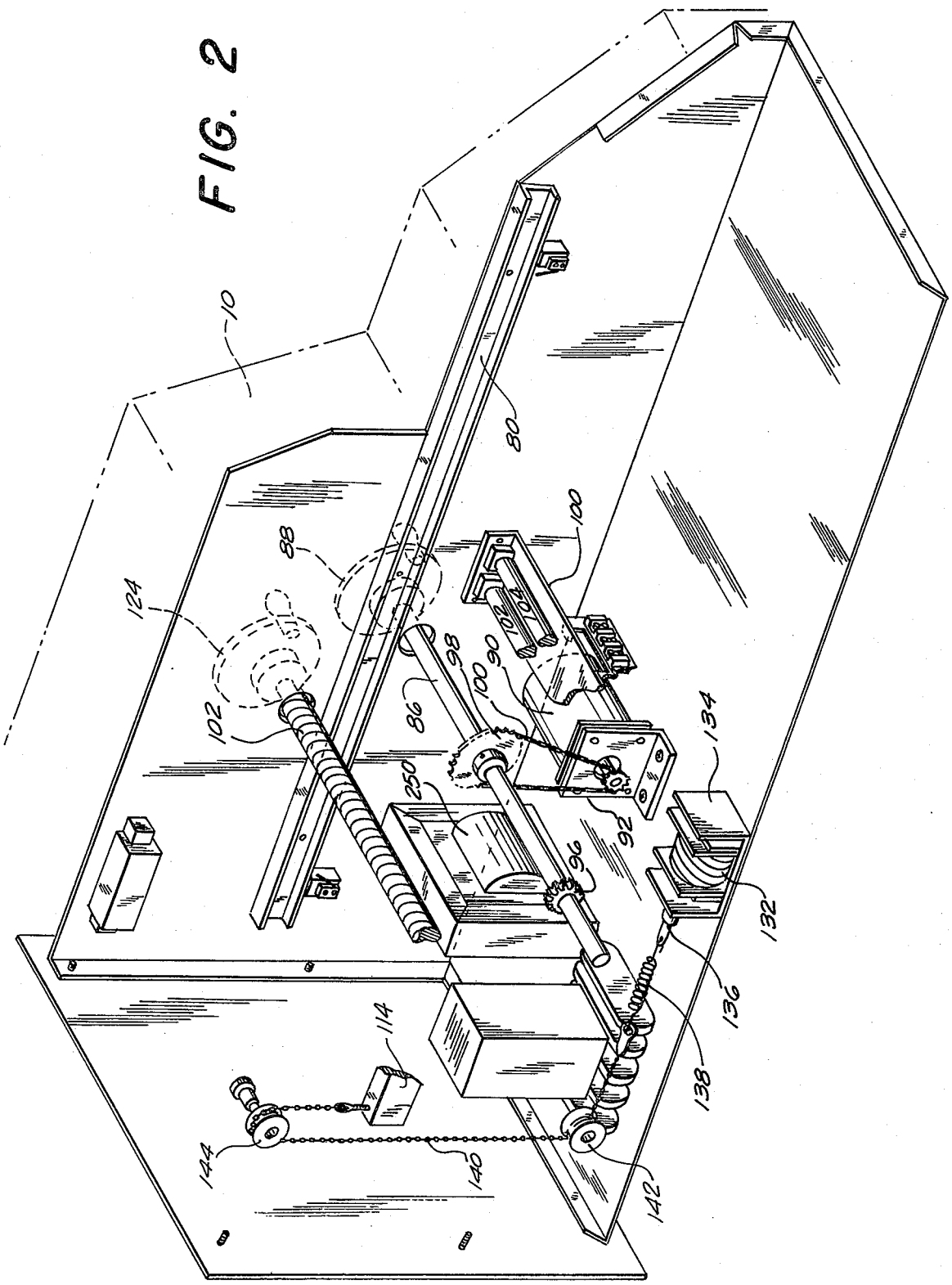

DENSITOMETER FOR USE IN QUANTITATIVE THIN LAYER CHROMATOGRAPHIC ANALYSIS

This invention relates to a densitometer and more particularly to a densitometer for use in quantitative analysis of spots on a thin layer chromographic plate.

Thin layer chromotography is a chemical analytic technique whereby a chemical substance can be separated, identified, and quantitatively measured. This analytical technique is based on a physical property of chemical substances whereby different chemical substances in a mixture have different adsorption rates on a regular adsorbent material. The adsorbent material is utilized in the form of a thin, flat layer adhering to a support or base, commonly called a plate. The mixture to be analyzed is placed in the form of a spot on the adsorbent material. A solvent is then caused to continuously migrate over the spots. The migration of the solvent carries the substances present in the spot over certain distances on the adsorbent material, the distance which the substance is carried being dependent upon the chemical makeup of the specimen. As the substance is migrated along the adsorbent layer, the distance which each substance is carried is proportional to the partition coefficient of that substance. Subsequent to completion of the separation by means of the migration of the solvent, the spots are fixed in place on the adsorbent material by drying. After the spots are fixed, if they are not already visible they may be made visible by means of a developer. The developer can be ultraviolet light, radioactive materials, or chemicals sprayed on to the chromographic area to induce co-reaction with the substances.

Two different types of densitometers are commonly used, one of which senses diffuse reflectance of visible light from the spots on the plate and the other of which senses fluorescence of the spots after they have been irradiated with ultraviolet light. Which of these modes of operation are utilized depends upon the type of specimen to be analyzed and the types of chemicals used in developing the spots on the plate.

When the principle of diffuse reflectance is utilized, two separate beams of visible light are directed to different areas of the surface of the plate. During scanning, one of these beams (referred to as the read beam) illuminates the spotted area while the other beam (referred to as the reference beam) is directed over an area of the plate which is free from spots. The reflected light from each of these beams is sensed by separate sensing means (read and reference) which may be any type of photosensitive signal generating means. The intensities of the reflected light sensed by each of these sensing means are compared and the difference in the reflected intensities is converted to an electrical output which can be quantitatively measured and recorded. Different wavelengths of visible light can be obtained by the use of filters such that optimum results can be obtained with a variety of different developer substances.

Quantitative analysis of the spots on a thin layer chromographic plate can also be performed by fluorescence and fluorescence quenching techniques. In this case, after the thin layer chromographic plate containing ultraviolet indicating phosphor has been spotted and prepared, it is preferably covered with a quartz cover plate. The plate assembly is oriented so that the quartz plate is situated between the source of ultraviolet light and the thin layer chromographic plate. The back of the thin layer chromographic plate is then adjacent the sensing means. The ultraviolet light from the ultraviolet light source will pass through the quartz plate and irradiate the thin layer chromographic plate. The spots on the thin layer chromographic plate will fluoresce and this fluorescence will be in the visible light spectrum. The sensing means will again detect the light intensities and the compared differences thereof will be converted into electrical signals in the same manner as described above.

While sensing is taking place in either of the above-described modes, the sensing means and the thin layer chromographic plate are moved relative to each other such that the plate is scanned. While scanning is taking place, the output signals generated by the densitometer may be quantitatively measured, as for example with a meter, and recorded, if desired. It is therefore important that the output signals created by the densitometer be compatible with existing chart recorders, digital readout devices, and electronic data processing hardware. Further, it is desirable to have a variety of scan speeds which can be controlled by the densitometer itself or externally set by recording equipment having remote scan control capability.

The portion of the heat assembly which contacts the thin layer chromographic plate during scanning is the most sensitive portion of the apparatus and is therefore preferably protected against scraping and breakage to assure accuracy of measurement and long life of the device. In order to reduce marring of this portion of the head assembly as it moves relative to the plate, a Teflon coating is often utilized. Moreover, it is preferable to have the head vertically movable to a remote position from the support when the plate is being inserted into the densitometer to prevent damage to the head assembly. Further, it is desirable to have some means of releasably securing the plate to the plate support such that relative motion therebetween is eliminated. This relative motion could cause head damage or distort the output record which depends upon a constant scan of the plate.

Densitometers which utilize a balance meter to indicate the magnitude of the difference in intensities between the read sensing means and the reference sensing means often suffer from sticking of the meter pointer in a particular position, sometimes called meter pinning, because the sensitivity of the meter is constant throughout its range. In order to eliminate this problem, the present invention incorporates a damping circuit which causes the balance meter to be sensitive around the balance point and relatively insensitive at points remote from the balance point. The circuit eliminates needle pinning and therefore enhances the accuracy of the readout of the densitometer.

In densitometers having facility for vertically moving the head assembly to a point remote from the plate, a problem arises if the sensing means is energized during movement of the head assembly because this movement induces changes in the magnitude of the output signals which are being recorded. These changes do not correspond to actual variations in the density of the spots on the plate and thus become false output readings. Therefore, if the head is moved up when the sensing means are energized, the recorder will record a change in light intensity which is not actually present. In order to eliminate this problem the present invention includes a circuit which automatically deactivates the sensing means unless the active portion of the head assembly is adjacent the thin layer chromographic plate.

In order to control the position of the active portion of the head assembly, the present invention utilizes a solenoid whose plunger is operably connected to the head assembly. A high voltage transient pulse circuit is provided to enhance the pull on the plunger when the plunger is relatively remote from the coil, thus assisting initial movement of the plunger. This mode of operation permits smoother functioning of the solenoid.

It is a prime object of the present invention to provide a densitometer for use in quantitative analysis of spots on a thin layer chromographic plate which can be used in both the reflectance and fluorescence modes of operation.

It is a second object of the present invention to provide a densitometer for use in quantitative analysis of spots on a thin layer chromographic plate which utilizes a head assembly having an active portion which is mounted to move to a position remote from the chromographic plate to provide for easy insertion of the plate to the device and to protect the active portion of the head from damage.

It is a third object of the present invention to provide a densitometer for use in quantitative analysis of spots on a thin layer chromographic plate which includes means for identifying the spot area on the plate which is being read.

It is a further object of the present invention to provide a densitometer for use in quantitative analysis of spots on a thin layer chromographic plate which includes releasable means for securing the plate to the support structure thereby eliminating any relative movement therebetween.

It is still a further object of the present invention to provide a densitometer for use in quantitative analysis of spots on a thin layer chromographic plate of the type which utilizes a balance meter and which includes a damping circuit to adjust the sensitivity of the meter at various points in the meter range, thus eliminating needle pinning.

It is another object of the present invention to provide a densitometer for use in quantitative analysis of spots on a thin layer chromographic plate which has a head assembly which is movable to a point remote from the plate and which incorporates a means for deactivating the sensing means unless the head is adjacent the plate thereby eliminating false readout caused by vertical movement of the head relative to the plate during scanning.

It is still another object of the present invention to provide a densitometer for use in quantitative analysis of spots on a thin layer chromographic plate which utilizes a solenoid to control the vertical position of the head and which incorporates a high voltage transient pulse generating circuit to provide smoother operation of the solenoid.

In accordance with the present invention, a densitometer for use in quantitative analysis of spots on a thin layer chromographic plate is provided. The densitometer includes a plate support which is movable along a line in a horizontal plane either manually or automatically by means of a motor. A head assembly is positioned above the support and horizontally movable in a plane parallel to the plane of movement of the support but along a line orthogonal to the movement of the support. The head assembly is manually movable to set the head in the appropriate initial position with respect to the plate such that the desired area may be scanned. The head is provided with a pointer extending therefrom to indicate the position of the head with respect to the plate and thus the scanning area.

The head assembly comprises a container portion provided with two sources of visible light and two sensing means preferably in the form of cadmium sulfide cells. The active portion of the head assembly is connected to the components of the container portion by means of four fibre optic bundles each of which is associated with a different one of the components situated in the container portion. The fibre optic bundles are arranged such that light from one of the visible light sources (read) is transmitted to the active portion and directed onto the spotted area of the plate and light reflected from this illuminated area is transmitted by another of the fibre optic bundles back to the read sensing means. Light from the other (reference) visible light source is transmitted to the active portion by a third fibre optic bundle and directed onto a nonspotted area of the plate. The last fibre optic bundle is utilized to transmit light reflected from the non-spotted area on the plate back to the reference sensing means. In this way, light reflected from a spotted portion of the plate and light reflected from a reference portion of the plate are each separately sensed.

The head assembly is pivotally mounted in the densitometer housing such that the active portion thereof can be raised or lowered with respect to the plate support. This vertical movement of the active portion of the head assembly is accomplished by a solenoid which is actuated by a circuit which incorporates a high voltage transient pulse generating means. This pulse generating means enhances the operation of the solenoid by assisting the initial movement of the plunger thereby providing smoother operation of the solenoid. The active portion of the head assembly can be raised or lowered by manual actuation of a switch and is automatically raised when the power to the densitometer is cut off. The raising of the head to a remote position relative to the plate support is a safety measure to prevent damage of the head during insertion of the plate into the densitometer.

To protect the active portion of the head assembly from wear as it moves along the plate during the scanning operation, the portion of the head contacting the plate surface is provided with a Teflon coating to reduce friction between the surfaces and protect the ends of the fibre optic bundles. Means are provided for deactivating the sensing means unless the active portion of the head assembly is in the lowered position, thus preventing output transients due to movement of the head as it is raised from being recorded and thus mistaken as variations in density.

The support itself is a frame-like member which contacts only peripheral portions of the plate and has rectangular opening in the middle thereof aligned the spotted area of the plate. Immediately beneath the support in alignment with the active portion of the head assembly is provided a pair of ultraviolet light sources, one emitting short wavelength ultraviolet light and the other emitting long wavelength ultraviolet light. When the device is used in the fluorescence and fluorescence quenching modes, a quartz cover is placed over the plate adjacent the spotted side thereof. The plate and cover are then turned over and placed on the support with the quartz cover below the plate and the nonspotted surface of the plate facing the head. The appropriate UV light source is energized such that it irradiates the spots on the plate, which has been specially prepared with ultraviolet indicating phosphors. As the spots are irradiated by the ultraviolet light, they fluoresce in the visible spectrum and the visible light given off is conducted by the two fibre optic bundles to their respective sensing means. Since one of the bundles is aligned with a spotted area on the plate and the other with a nonspotted area on the plate, again the difference in the light intensities between these two areas of the plate can be determined. Thus, the densitometer of the present invention can be utilized in the reflectance mode or in the fluorescence mode, as desired, depending upon the specimens being analyzed and the type of developers used.

A balance meter is provided such that the difference in light intensities between the light sensed from the spotted areas of the plate and the light sensed from the reference areas of the plate can be quantitatively measured. The driving circuit for this balance meter includes a damping circuit which varies the sensitivity of the meter over the meter range. Thus, the damping circuit causes the meter to be extremely sensitive around the balance point but less sensitive at points remote from the balance point to prevent needle pinning. The densitometer is provided with means for connecting the output thereof to standard chart recording and electronic data processing systems such that the output can be permanently recorded or processed to obtaiin statistical obtain To the accomplishment of the above, and to such other objects as may hereinafter appear, the present invention relates to a densitometer for use in quantitative analysis of spots on a thin layer chromgraphic plate as defined in the appended claims and as described in the specification, taken together with the accompanying drawings in which like numerals refer to like parts and wherein:

FIG. 1A is an isometric view of the densitometer of the present invention;

FIG. 1B is an isometric view of the thin layer chromographic plate and quartz plate cover as used in the densitometer of the present invention when the densitometer is used in the fluorescence mode;

FIG. 2 is an isometric fragmentary view of the housing of the present invention sharing certain of the mechanical portions of the device;

Figure 5:
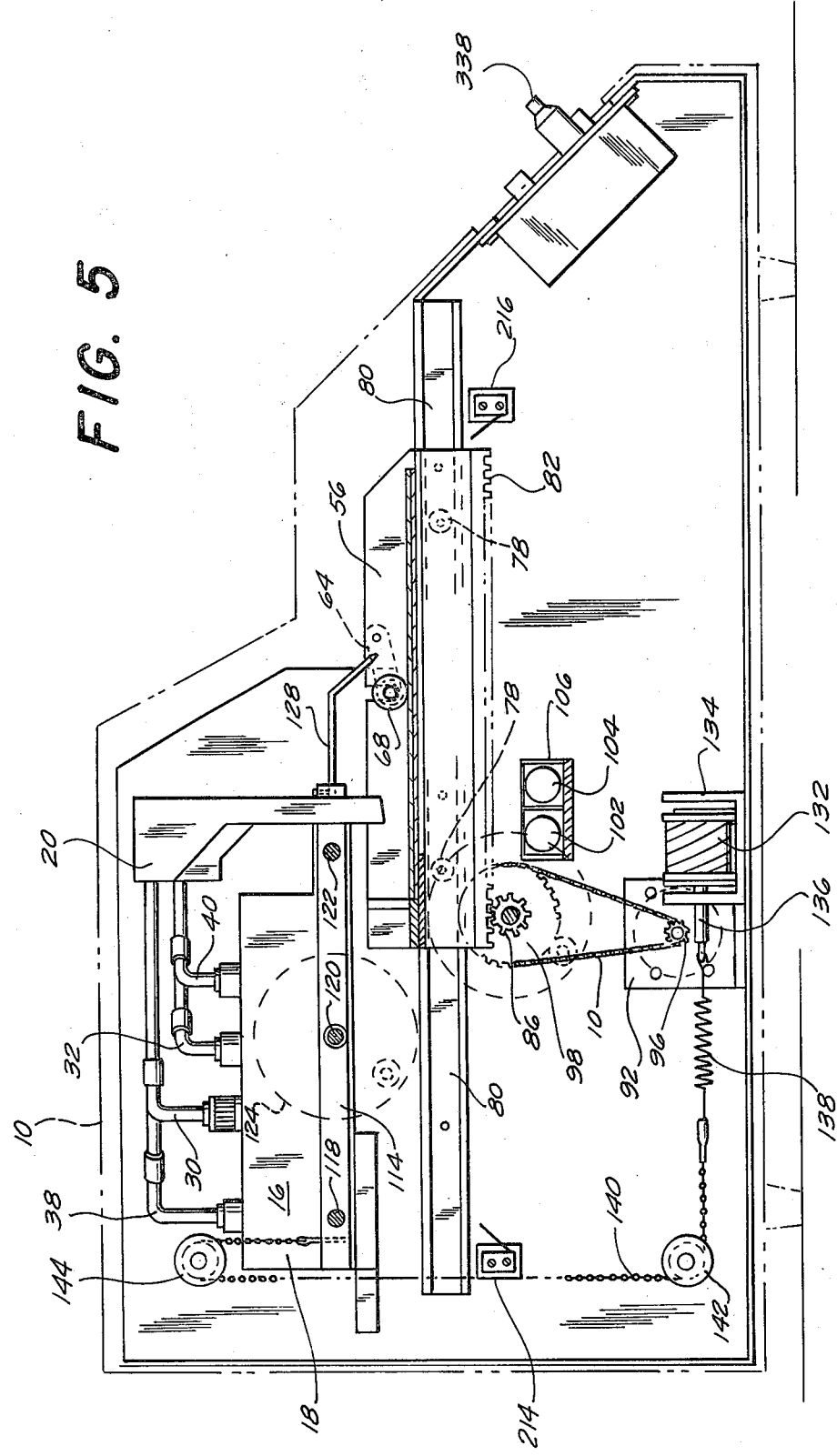
FIG. 5 is a side cross sectional view of the densitometer of the present invention.

As seen in FIGS. 1A, 2 and 5, the densitometer of the present invention comprises a housing 10 including a cover 11 which opens to expose a cavity 12 wherein a horizontally movable (right and left as shown in FIG. 5) plate support 14 is situated. Also provided in cavity 12 above plate support 14 is a head assembly 16 which is movable in a direction transverse to the movement of plate support 14 (in and out of the plane of FIG.).

Figure 3:
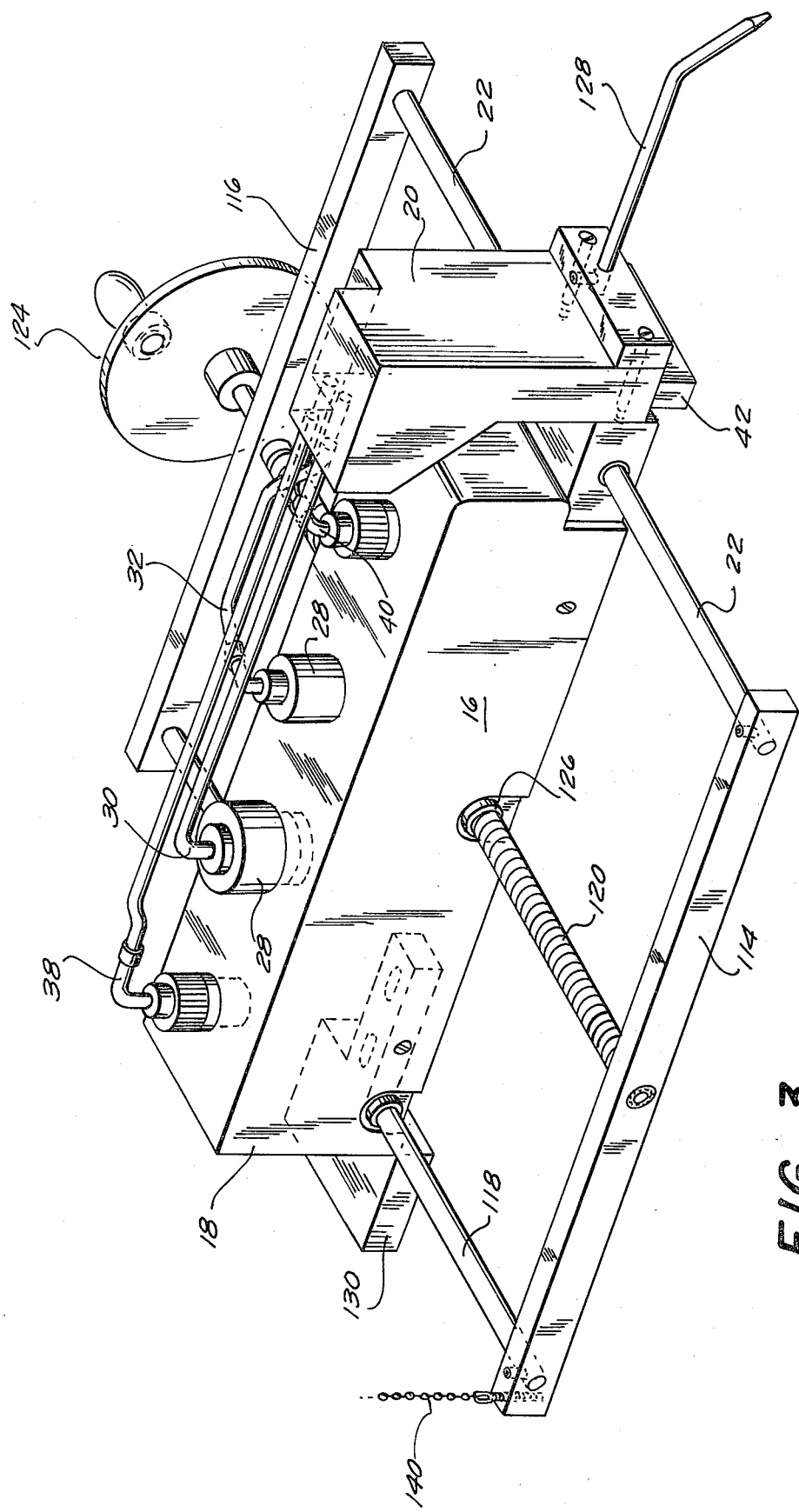
FIG. 3 is an isometric view of the head assembly of the densitometer of the present invention.
Figure 6:
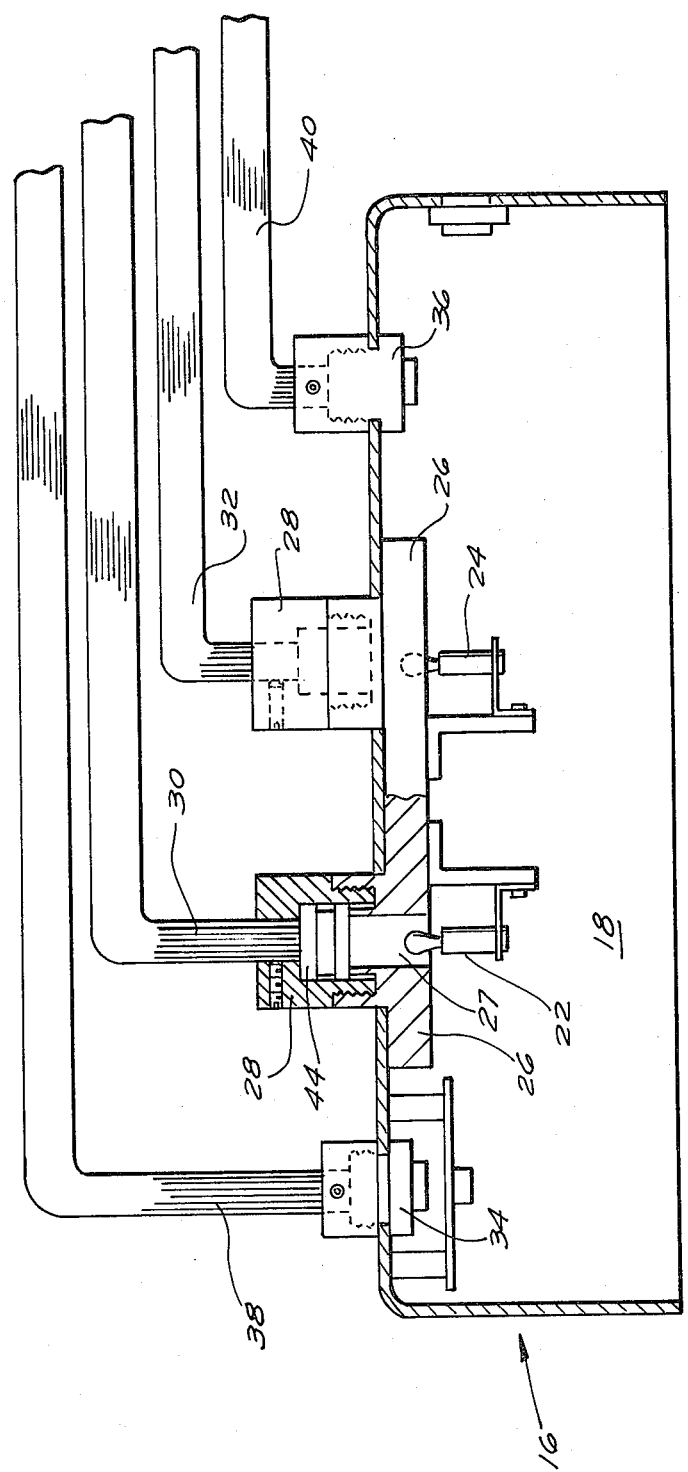
FIG. 6 is a side cross sectional view of the container portion of the head assembly of the present invention.

Head 16 comprises a container portion 18 (FIG. 6) and a fibre optic head portion 20 which is the active portion of the head assembly. As can be seen in FIG. 6, container portion 18 of head assembly 16 contains two visible light sources, a read light and a reference light, in the form of bulbs 22 and 24, respectively, each of which is situated within a different base 26. Each base 26 has a hollow central portion 27 forming a passage for light from the bulb associated therewith. A cylindrical cover 28 is provided for mounting on each base 26. Each cylindrical cover 28 is hollow and has an opening at the bottom thereof such that it is adapted to fit securely on the top of base 26. The opening at the top of cover member 28 is formed to accept the input end of the fibre bundle. Bulb 22 illuminates the input end of fibre bundle 30 while bulb 24 illuminates the input end of fibre bundle 32. The ouput ends of fibre bundles 30 and 32, respectively, are situated in the lower portion of fibre optic head 20. Sensing means, preferably in the form of two cadmium sulfide cells 34 and 36, are also mounted within the container portion 18. Cadmium cells 34 and 36 are connected to fibre optic head 20 by means of fibre optic bundles 38 and 40, respectively. Fibre optic bundles 38 and 40 have their light input ends situated in fibre optic head 20 and their light output ends situated adjacent the respective cadmium sulfide cells. Fibre optic head 20 is preferably formed of molded plastic with the ends of the fibre optic bundles adjacent the surface of tip 42 (FIG. 3). Preferably the surface of the tip 42 has a thin Teflon coating to protect the ends of the fibres and reduce friction between tip 42 and the thin layer chromographic plate as the plate is moved relative to tip 42 during scanning.

When the densitometer of the present invention is utilized in the diffuse reflectance mode, light bulbs 22 and 24 are energized to emit light in the visible spectrum. The light from each of these bulbs is transferred to fibre optic head 20 by means of fibre optic bundles 30 and 32, respectively. Fibre optic head 20 is positioned with respect to the spots on the thin layer chromographic plate such that the light from fibre optic bundle 30 illuminates a spotted area and the light from fibre optic bundle 32 illuminates a nonspotted area. The light reflected from the spotted area is received by the input end of fibre optic bundle 38 and transferred to read cadmium sulfide cell 34. Likewise, the light reflected from the nonspotted area is received in the input end of the fibre optic bundle 40 and transferred to reference cadmium sulfide cell 36. Although the sensing means described herein comprise cadmium sulfide cells, it should be understood that any photosensitive signal generating device of sufficient sensitivity may be substituted therefor. The reflected light intensities incident to each of the cadmium sulfide cells are then compared and the difference in the reflected intensities is converted into an electrical output.

A filter mounting structure 44 is provided within cover member 28 and adopted to receive one of a series of interchangeable filters which are provided to vary the illumination source frequency so that it may be matched to the color produced by the sample of staining system. Thus, by simply removing cover 28 a new filter can be substituted for the one present in mounting 44, if a different illumination frequency is desired.

Figure 4:
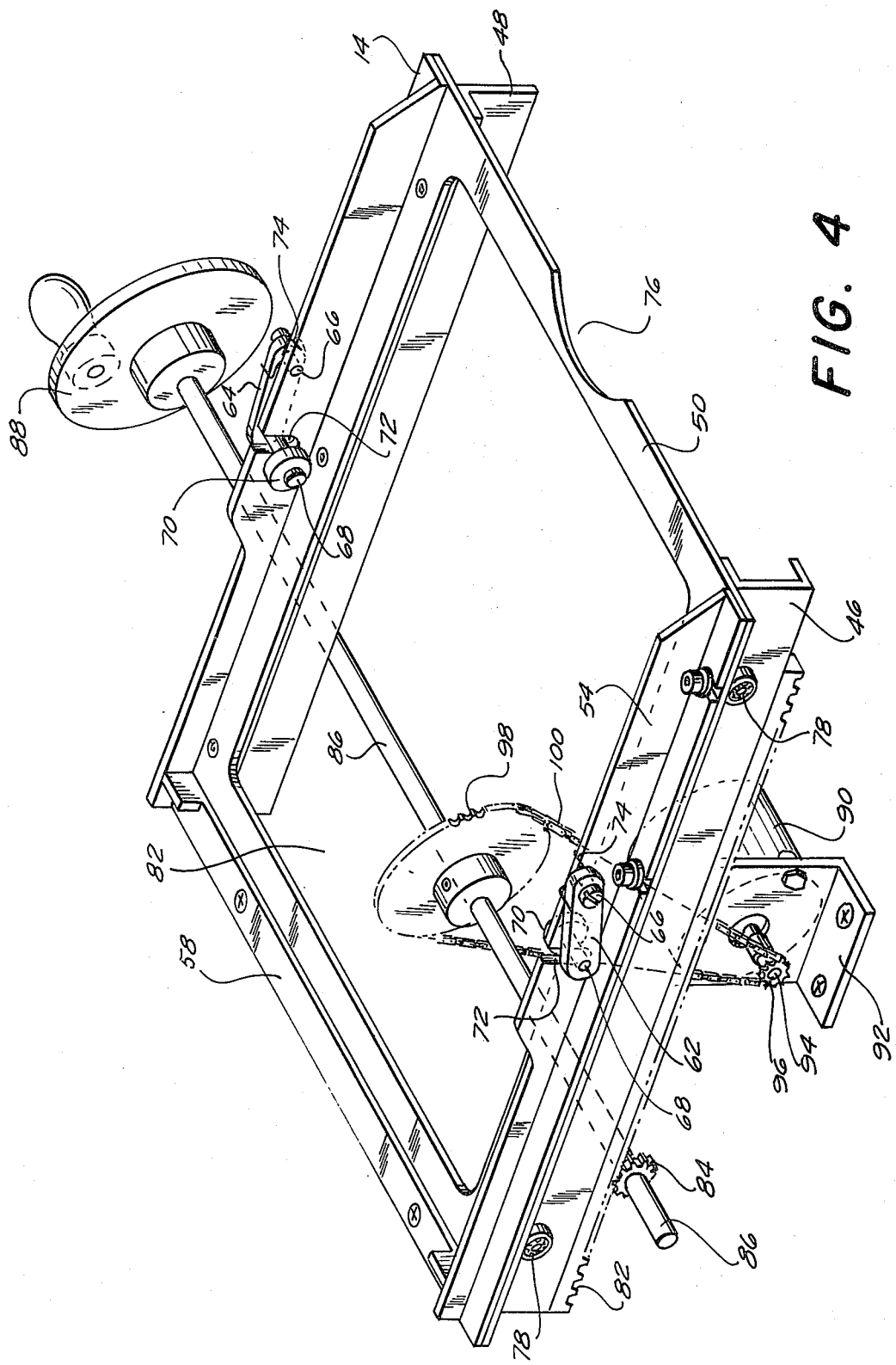
FIG. 4 is an isometric view of the plate support and drive therefor utilized in the densitometer of the present invention.

As best seen in FIG. 4, the plate support comprises a pair of vertical members 46 and 48, each of which is fixed to a different side of the bottom of frame portion 50. Frame portion 50 has a substantially rectangular shape with a large rectangular opening 52 therein. Frame portion 50 will contact only peripheral portions of the thin layer chromographic plate and the spotted areas thereof will all be situated over opening 52. In order to accurately position the plate with respect to frame 50, a pair of side rails 54 and 56 and a back rail 58 are provided. Releasable hold-down means 60 and 62 are provided on side rails 54 and 56 respectively. Each releasable hold-down means comprises an elongated member 64 which is rotatably mounted to the side rail by means of a pin 66. On the opposite end of elongated member 64 is a second pin 68 which has a hold-down roller 70 mounted thereon. Roller 70 is spaced along pin 68 from elongated member 64 by a distance at least equal to the width of the adjacent side rail. Each side rail is provided with a groove 72 adopted to receive pin 68. A spring 74 is provided around each shaft 66 to urge elongated member 64 into a rotational position wherein pin 68 is situated within groove 72 and roller 70 rests on the surface of frame 50.

When the thin layer chromographic plate is inserted into support 14, the sides of the plate are placed between the side rails 54, 56 and the plate is pushed towards the back of the densitometer until the leading edge abuts rollers 70. Rollers 70 are cammed out of the way and the plate is pushed until the leading edge abuts back rail 58. Because of the spring loading of each of the elongated members 64, the hold-down rollers 70 exert a downward force on the plate, thus tending to eliminate any movement of the plate relative to support 14. Removal of the plate is facilitated by means of a semicircular opening 76 on the forward portion of frame 50. This opening permits the operator to grab the plate between his thumb and forefinger without interference from frame 50.

Each of the members 46 and 48 is provided with a pair of rollers 78 which are mounted on shafts perpendicular to members 46 and 48. Rollers 78 are adopted to fit in tracks 80 situated on either side of the housing 10. This configuration permits the planar movement of support 14 in a horizontal plane along a line parallel to the side rails. This movement can be produced manually or automatically. Member 46 is provided with a rack 82 situated to mesh with pinion 84 fixedly mounted on rotatable shaft 86. A hand crank 88 is mounted on the portion of shaft 86 which extends to the exterior of housing 10. As hand crank 88 is turned, pinion 84 is rotated thus causing rack 82 and therefore frame 50 to move along a horizontal plane determined by track 80. A motor 90 is mounted on bracket 92 below support 14. Motor 90 rotates a shaft 94 which is connected to shaft 86 by means of sprockets 96 and 98 and chain 100. Becuase of the flexibility of chain 100, motor 90 will be able to deliver the appropriate driving power to move support 14 regardless of the position of shaft 86.

Below support 14 are provided two ultraviolet illuminating sources 102 and 104 in a fixture 106. Fixture 106 is aligned with opening 52 in all positions of support 14 such that the light therefrom will pass through opening 52 to the thin layer chromographic plate situated on frame portion 50. Preferably, ultraviolet bulb 102 is a short wave fluorescent tube while ultraviolet tube 104 is a long wave fluorescent tube. To operate in the fluorescent or fluorescence quenching modes, the thin layer chromographic plate is spotted and developed using ultraviolet indicating phosphors. The plate 110, as shown in FIG. 1B is then covered with a quartz cover 112 such that the spotted surface is adjacent cover 112. The cover and plate are then inserted onto support 14 with the quartz cover 112 on the bottom such that head 16 is adjacent the nonspotted surface of plate 110. The appropriate fluorescent tube is energized, thus causing ultraviolet light to pass through the quartz cover 112 and irradiate plater 110. Since the resulting fluorescence will be in the visible light range, fibre optic bundles 38 and 40 will again carry light to their respective cadmium sulfide cells. The light carried by fibre bundle 38 will be light which was produced by that portion of plate 110 which was spotted, and the light carried by fibre optic bundle 40 will be produced by that portion of the plate which was not spotted. Again, these light intensities will be compared and the difference converted into an electrical signal as described above.

As can be best seen from FIG. 3, head assembly 16 is mounted on a pair of side supports 114 and 116 by means of three parallel shafts 118, 120 and 122. Shaft 120 is rotatably mounted between supports 114 and 116 and extends beyond support 16 to a point outside housing 10. Shaft 120 is provided with a hand crank 124 such that it can be manually rotated. Shaft 120 is also provided with an externally threaded surface which meshes with internal threads (not shown) within the aperture 126 in head assembly 16 through which it extends. Shafts 118 and 122 extend through nonthreaded apertures in head assembly 16. Thus, as hand crank 124 is rotated, head assembly 16 will be axially moved along shaft 120, thus causing the head assembly 16 to move in an orthogonal direction relative to the movement of support 14. The operator of the densitometer will rotate hand crank 124 until fibre optic head 20 is directly over the area on the thin layer chromographic plate which he wishes to scan. Pointer 128 is provided extending from fibre optic head 20 such that the operator can readily see which area the head assembly 16 is positioned to scan.

Shaft 120 is mounted to housing 10 by means of brackets (not shown) such that head assembly 16 is permitted to pivot about shaft 120. Thus, head assembly 16 can pivot vertically moving the active portion of assembly 16 between an operative position wherein fibre optic head 20 is adjacent a plate on support 14 and an inoperative position (as shown in FIGS. 1A and 5) wherein fibre optic head 20 is in a relatively remote position from the plate on support 14. A counterbalancing weight 130 is mounted on the bottom of the rear section of head assembly 16 to retain head assembly 16 in the inoperative position. A solenoid 132 is mounted to the bottom of housing 10 by means of mounting plate 134. Solenoid 132 is provided with a plunger 136 which is operably connected to the rear portion of side support 114 by means of a spring 138 and a chain 140 which is held in position by pulleys 142 and 144. When solenoid 132 is energized, it pulls plunger 136 towards the front of the densitometer (right, as seen in FIG. 5) thus causing chain 140 to move to the rear of side support 114 towards the top of the densitometer. The movement of the rear portion of side support 114 causes the clockwise rotation of head assembly 16 about shaft 120 thus causing fibre optic head 20 to move vertically towards the thin layer chromographic plate on support 14 such that the tip portion 42 is adjacent the plate surface.

As long as solenoid 132 remains energized, head assembly 16 will remain in this position and tip 42 will be adjacent the surface of the plate. When head assembly 16 is in this position, the cadmium sulfide cells are activated and the densitometer is operational. However, should the densitometer be turned off, the solenoid 132 will become deactivated, thus permitting plunger 136 to move towards the rear of the densitometer and to relax its pull on chain 140. This will cause head assembly 16 to return to the position shown in FIG. 5 because of the weight of counterbalance 130. This is a safety measure which is incorporated into the system so that the plate will not accidentally be pulled from the densitometer when the power is off and the head is touching the surface of the plate; such movement might scratch or mar the plate.

When the power to the densitometer is again turned on, the solenoid will have to be separately activated to again lower the fibre optic head 20 to the plate. Thus, a plate may be inserted into the device without the possibility of damaging the head. Further, when the fibre optic head 20 is raised, the cadmium sulfide cells are automatically deactivated such that no output is generated by the densitometer. This is to prevent recording of any change in light intensity which does not correspond to a change in density of the spots caused by the lifting of the head during scanning.

Figure 7:
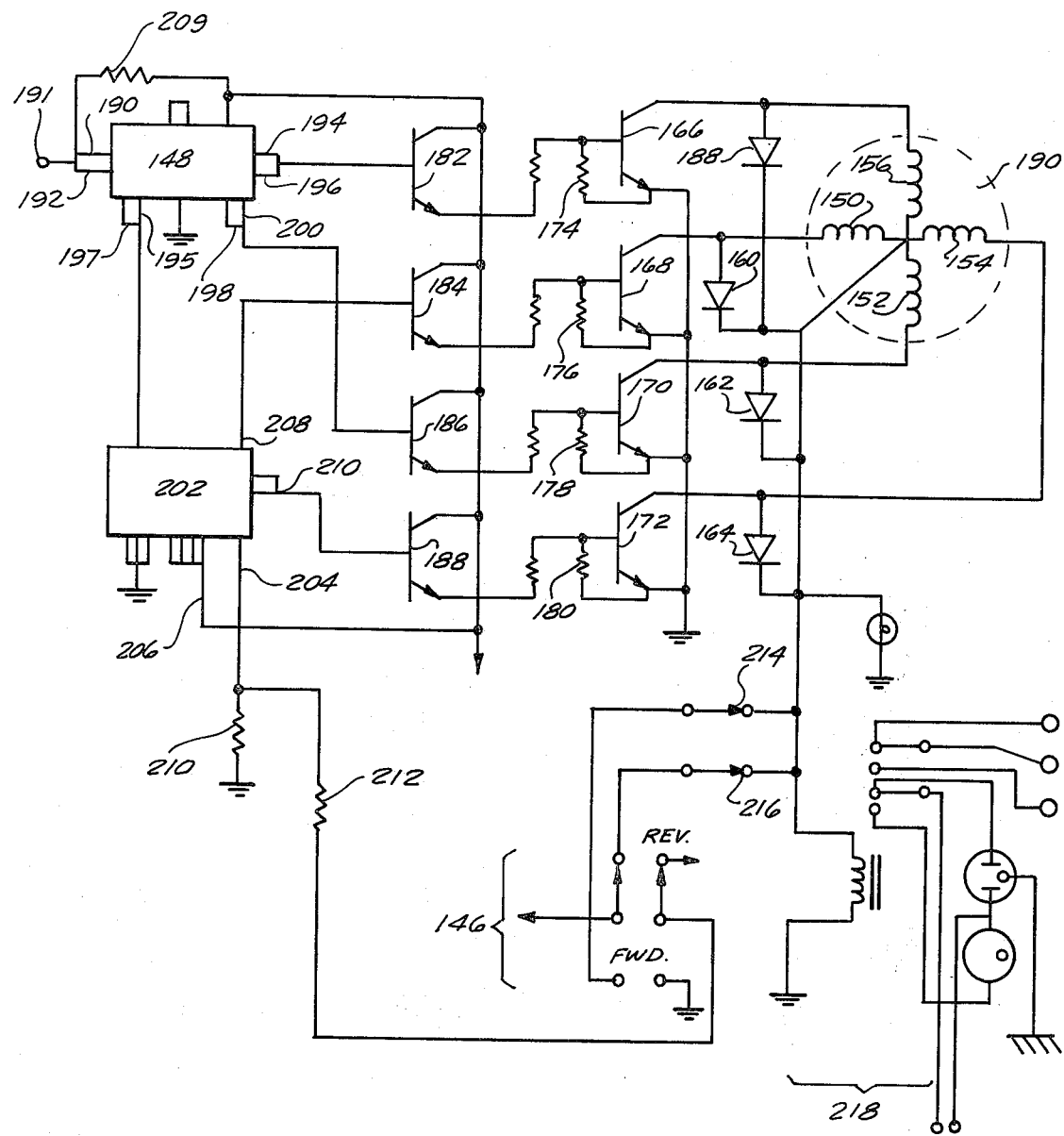
FIG. 7 is a schematic diagram of the motor driver circuit including remote control circuitry for operation thereof.

FIG. 7 shows the circuitry utilized to drive motor 90 to move support 14. Basically, the speed of motor 90 is controlled by the frequency of a negative-going pulse generated either by the circuitry shown in FIG. 8 or an external source. These pulses are fed to a logic circuit 48 which, in accordance with the timing of the pulses, renders the appropriate power transistors conductive thereby sequentially energizing the motor windings. The faster the pulses are received, the faster the motor windings are energized, thus the faster the motor turns. The sequence in which the motor windings is energized may be reversed by means of a second logic circuit 202 which is connected to logic circuit 148. Circuit 202 functions to reverse the order in which the power transistors are rendered conductive by logic circuit 148 thus causing the motor 90 to turn in the opposite direction. A switch 146 is provided to control logic circuit 202 and thus the direction of motor rotation.

The motor driver circuitry is controlled by means of a double pole, double throw switch 146. When switch 146 is in the center (off) position, power to the motor is removed and the support 14 may be moved manually by means of hand crank 88. When switch 146 is thrown into the forward position, motor 90 runs clockwise at a rate determined by the pulse repetition rate input to a master slave flip-flop circuit 148. Each winding of motor 90 has a DC resistance of 90 Ohms and is rated at 24 volts DC. To make one full shaft rotation, the motor makes 192 steps. During motor operation, two adjacent windings are always energized. To move clockwise, first windings 152 and 150 are energized, then 150 and 156, then 156 and 154, etc. To go counterclockwise, the energization sequence is reversed. The faster the switching takes place, the faster the motor runs. The speed of switching is determined either by negative pulses generated by the circuitry shown in FIG. 8 or by an external source, such as a chart recorder with remote control capability, connected to the circuit. Diodes 158, 160, 162 and 164 absorb the high voltage transient pulses that occur when the windings are de-energized. Power transistors 166, 168, 170 and 172 are high powered switching transistors which are switched between saturation and cutoff. Resistors 174, 176, 178 and 180 are utilized to insure complete cutoff condition of the transistors to which they are connected. Transistors 182, 184, 186 and 188 are operated in a common collector mode to provide the appropriate current gain. In effect, these transistors serve as buffers between the integrated circuits and the power transistors.

Figure 8:
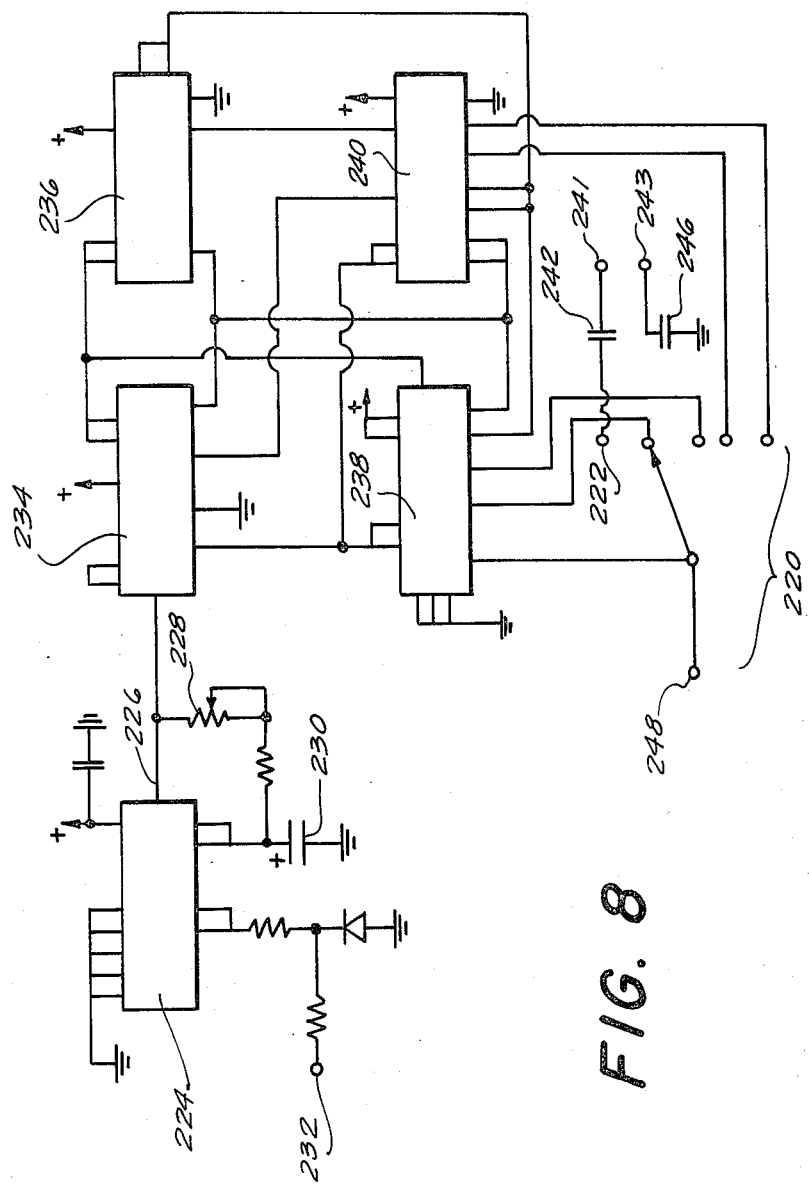
FIG. 8 is a schematic diagram of the pulse generator circuit which generates negative pulses required to operate the motor driver circuitry for the densitometer of the present invention.

The master-slave flip-flop 148, which is connected to receive the motor speed determining negative pulses from the circuitry of FIG. 8, is wired to assume four discrete output states, each of which causes a different pair of motor windings to be energized. The change from one state of the next (thus from one winding energization sequence to the next) is accomplished by applying a negative-going pulse to input terminals 190 and 192. Terminals 194 and 196 as well as 198 and 200 form complementary output terminal pairs. Logic circuit 202 connected to flip-flop 148 through terminals 195 and 197 permits the changing of the motor direction. Logic circuit 202 comprises a pair of series connected OR gates (not shown). When a logic zero is applied to terminal 204, circuit 202 generates a noninverted output, whereas when a logic 1 is applied the output is inverted. Because terminal 206 is always supplied with a logic 1 input, the output generated on terminal 208 is always the complement of the output on terminal 210, and hence transistor 184 and transistor 188 are never saturated at the same time. Which of these transistors 184 or 188 is saturated at any particular moment depends upon the logic level at terminal 204, which in turn depends upon the state of switch 146. Resistor 209 assures a logic 1 signal at terminals 190 and 192 of flip-flop 148 in the absence of a negative-going input pulse supplied to node 191. Resistors 210 and 212 are provided to protect circuit 202 from high voltage transients when switch 146 is in the off position. A pair of micro switches 214 and 216 are provided on either end of track 80 (see FIG. 5) such that when support 14 reaches the end of the track the motor will automatically be de-energized.

The motor can also be controlled by external instrumentation, such as a chart recorder having remote control capability by means of remote control relay 218, if desired. Internal control of the stepping motor permits support speeds of 2, 4, 6 and 10 cm/minute. However, when external circuitry is utilized via remote control relay 218, speeds of up to 30 cm/minute may be achieved.

The circuit shown in FIG. 8 generates the negative-going pulses to node 191 of circuit 148 required to operate the motor drive circuitry. Four different pulse rates can be selected from the selector switch 220.

With the switch in the external position 222, pulses from an external source, such as a recorder, can be utilized to determine motor speed.

The circuit comprises a dual four-input Schmidt trigger 224 of which only a single trigger is utilized. A square wave is generated at terminal 226 whose frequency is determined by the resistance of variable resistor 228 and the capacitance of capacitor 230. The resistance of resistor 228 is made adjustable to provide an operating frequency of 600 Hz. 120 Hz synchronous pulses are taken from the power supply (described in detail below) at terminal 232 and the oscillator locks onto the fifth harmonic of this frequency so no drifting is possible. For European operation where 50 Hz power is employed, the synchronous pulse is 100 Hz and the oscillator locks onto the sixth harmonic. The four-bit binary counters 234 and 236 are utilized to divide the output of trigger 224 by powers of two. A quad 2-input NAND gate 238 and a dual four-input NAND gate 240 are provided. Different gates go to logic zero after the binary counters reach certain binary codes. If the selector switch is in the 2 cm/minute position, the appearance of the first pulse resets both counters and they start counting over again. This counting and resetting procedure occurs again and again. In the 4 cm/minute position, the pulses appear at the output twice as frequently as in the 2 cm/minute position. The motor is geared to support 14 such that 300 pulses cause 1 cm. of travel. Capacitors 242 and 246 serve to isolate the external source, which may be connected to the circuit by means of terminals 241 and 243 (to provide externally generated pulses) from the entire densitometer circuitry. The output of this circuit is generated at terminal 248 which is connected to terminal 191 of the motor driver circuit (FIG. 7).

Figure 9:
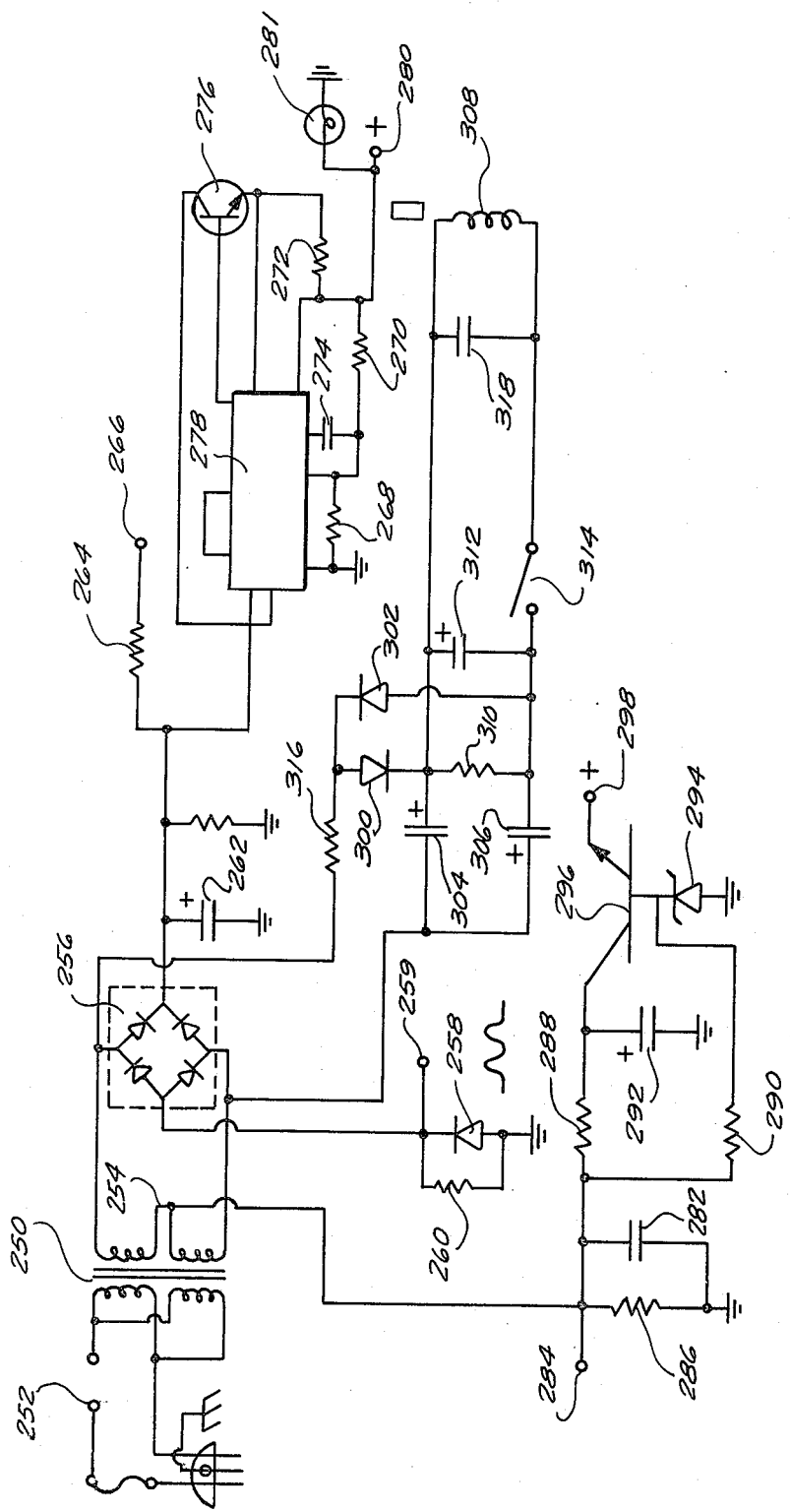
FIG. 9 is a schematic diagram of the power supply for the head positioning solenoid for the densitometer of the present invention.

The circuit shown in FIG. 9 is the power supply for the head positioning solenoid circuit as well as the stepping motor 90, the light sources 22, 24, 102 and 104, the indicator 279 and pilot lights 281, the reading circuitry (FIG. 11), as well as providing the synchronous pulses for the pulse generator circuitry previously described. Power is applied to the primary of the power transformer 250 through on-off switch 252. The primary is shown wired in parallel for 110 volt alternating current operation. For 220 volt alternating current operation, the primary must be wired in series. The secondary is wired to provide a 24 volt alternating current center tap 254. A bridge rectifier 256 is provided for full wave rectification of the alternating current. Diode 258 and resistor 260 allow low voltage synchronous pulses to be available to the pulse generator circuit at terminal 259. Capacitor 262 acts as a filter capacitor and resistor 264 as a bleeder resistor. Since the voltage across capacitor 262 is typically 36 volts, resistor 264 is required to provide 24 volt unregulated power at terminal 266 under a normal operating load.

A precision 24 volt regulated supply is provided by resistors 268, 270 and 272, capacitor 274 and transistor 276, as well as voltage regulator 278. The ratio of resistors 268 and 270 determines the output voltage. Capacitor 274 prevents oscillation and resistor 272 provides short circuit protection. Transistor 276 is used as an external pass transistor and is mounted on a heat sink. A 28 volt regulated voltage supply is provided at terminal 280.

Capacitor 282 acts as a filter capacitor for the 18 volt unregulated supply which appears at terminal 284. Resistor 286 acts as a bleeder resistor to discharge capacitor 282 when power is removed. Resistors 288 and 290, capacitor 292, diode 294 and transistor 296 form a 5-volt regulated output at terminal 298 for use by all the transistor transistor-logic digital circuits.

Diodes 300 and 302, as well as capacitors 304 and 306, form a voltage doubler circuit for initiating movement of plunger 136 within the coil 308 of solenoid 132. Under the very slight load of bleeder resistor 310, capacitor 312 charges up to 70 volts. When the solenoid switch 314 is turned on to raise the head, the 70 volts from capacitor 312 is initially placed across coil 308. However, because of the 300 ohm load of the coil 308, the voltage drops to a steady state value of 20 volts as a result of resistor 316. The characteristics of a solenoid circuit provide increased pull on the plunger as the plunger approaches the center of the core. The initial 70 volts gives the additional pull necessary to initiate movement of the plunger while the plunger is still relatively remote from the core, but the 20 volts is sufficient to hold the plunger once it gets within the coil. This mode of operation enhances the smoothness under which the solenoid functions. Capacitor 318 reduces high voltage transients when the solenoid is de-energized.

Figure 10:
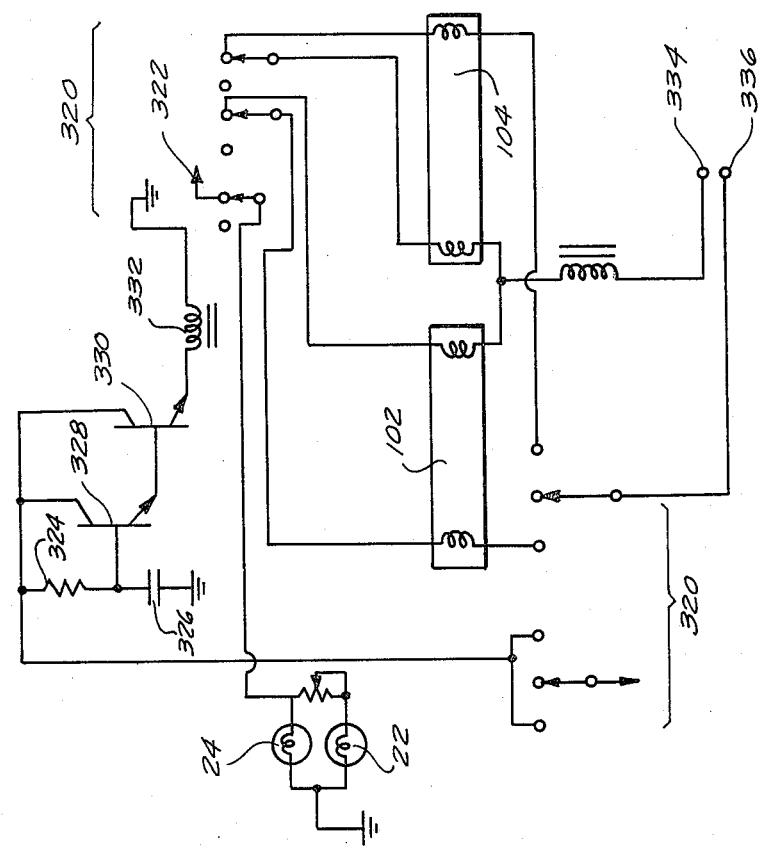
FIG. 10 is a schematic diagram of the light source circuitry of the densitometer of the present invention.

FIG. 10 shows a schematic view of the circuitry which is utilized to energize the various light sources. A three-position switch 320 is provided to switch between long wavelength ultraviolet light supplied by tube 104, visible spectrum light supplied by bulbs 24 and 26 and short wavelength ultraviolet light supplied by tube 102. Visible chromatograms are run in a reflectance mode as described above, whereas ultraviolet chromatograms are run in a transmittance mode using fluorescent solvents that radiate in the visible region. Incandescent bulbs 24 and 26 are used for the visible spectrum, and separate fluorescent tubes 102 and 104 are used for short and long wave ultraviolet light, respectively. An electronic circuit is employed to automatically start the fluorescent tubes.

When switch 320 is positioned to energize the incandescent bulbs 22 and 24, 24 volts of DC regulated power from node 280 (FIG. 9) are connected to bulbs 22 and 24 through node 322. In either of the long or short ultraviolet positions, the 24 volt source is disconnected from the incandescent bulbs 22 and 24 and applied to the circuit consisting of resistor 324, capacitor 326, transistors 328 and 330 and relay 332. Transistors 328 and 330 are wired as a Darlington pair which provides a minimum current gain of 2,500. Resistor 324 charges capacitor 326 and relay 332 pulls in about two seconds after power is applied. Capacitor 326 rapidly discharges through relay 332 when the power is removed because of the two forward biased emitter base junctions. During the time when the relay is out, the heater coils are heated in either the long or short ultraviolet tube depending upon the mode switch position. When the relay pulls in, the fluorescent light comes on. The fluorescent lights are powered by a 110 volt AC source connected at terminals 334 and 336.

Figure 11:
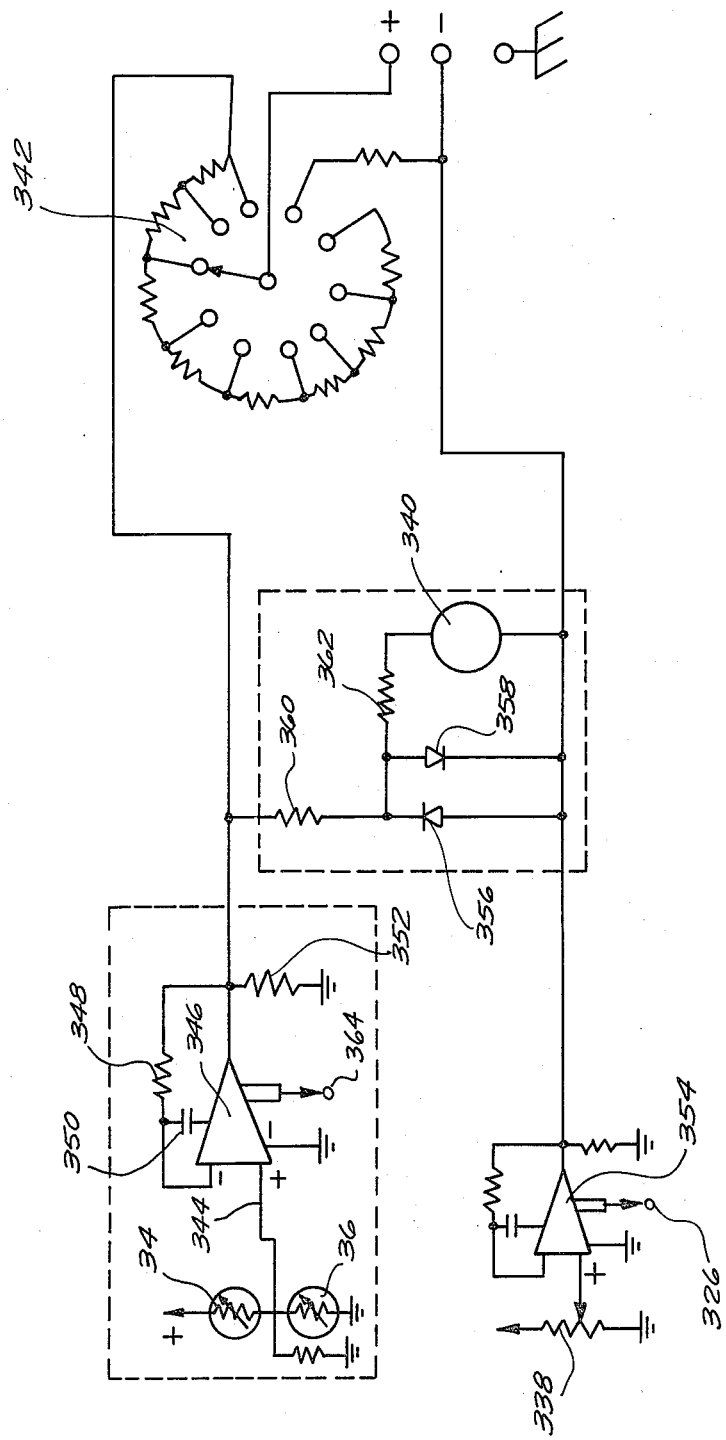
FIG. 11 is a schematic diagram of the circuit which converts the difference in light intensity picked up by the sensing means into a differential output electrical signal and includes the meter damping circuit for the densitometer of the present invention.

FIG. 11 shows a schematic diagram of the circuitry utilized to convert the difference in light intensity picked up by cadmium sulfide cells 34 and 36 into a differential output electrical signal. A balance control in the form of resistor 338 is provided to zero adjust the unit over a clear section of the thin layer chromographic plate. A balance meter 340 is provided for zero ajustment and an attenuator switch 342 is employed to provide a wide range of output levels.

As the light intensity between cadmium sulfide cells 34 and 36 varies, the voltage output at terminal 344 of voltage regulator 346 located in the head assembly 18 varies accordingly. The voltage regulator 346 is used as a buffer with a voltage gain of one. Resistor 348 is used to improve stability of the circuit with respect to temperature and capacitor 350 is utilized for frequency compensation. Resistor 352 provides a path to ground.

The balance potentiometer 338 drives another voltage regulator 354 which is likewise used as a buffer also with a voltage gain of one. The voltage between the outputs of the two voltage regulators 346 and 354 are compared to give differential output which is indicated on meter 340. The circuit comprising diodes 356 and 358 and resistors 360 and 362 along with meter 340 provides the damping circuit for the meter. The impedance of diodes 356 and 358 decreases with increasing current, and therefore the meter 340 has peak sensitivity around the balance point and is relatively insensitive far away from the balance point. This prevents meter pinning. The combination of resistor 362 and meter 340 is connected in parallel with each of the diodes 356 and 358. This parallel circuit is connected in series with resistor 360 between the outputs of each of the voltage regulators 346 and 354. An attenuator switch 342 which is a simple voltage divider circuit provides attenuation of up to 1,000.

Figure 12:
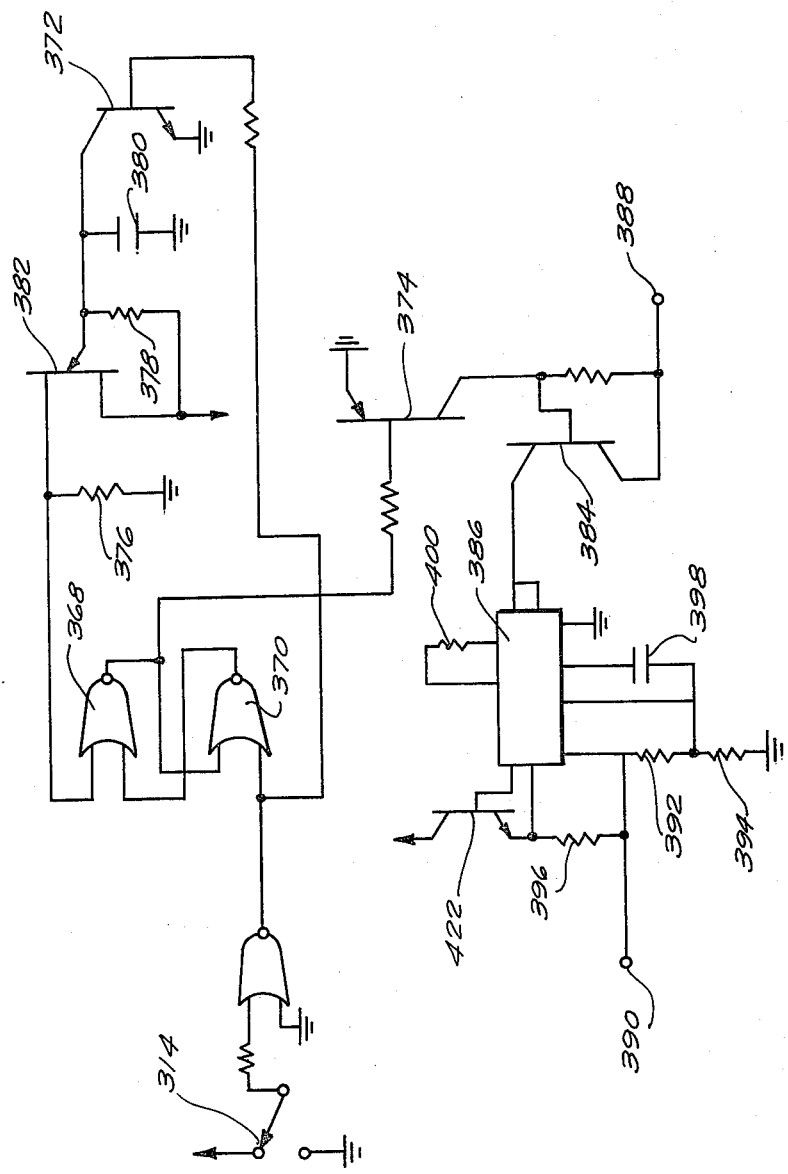
FIG. 12 is a schematic diagram of the sensing means power control circuit of the densitometer of the present invention.

Each of the voltage regulators 346 and 354 is energized by means of a 10 volt regulated power supply delivered to terminals 364 and 366, respectively. The circuit utilized to supply the 10 volt regulated power to each of these voltage regulators is shown in FIG. 12. The circuit shown in FIG. 12 supplies voltage to the voltage regulators 346 and 354 only when the head is in the lowered (operational) position. When the head is raised, no voltage appears, thus keeping the sensing means from generating output which represents changes in densities which are not really present on the plate.

When switch 314 is thrown to lower the head, a one second interval occurs and then the voltage supplied to the voltage regulators rises to a full 10 volts in less than a millisecond. Upon raising the head, the voltage goes to zero in less than one millisecond.

If the ten volt supply were always present, raising or lowering the head during scanning would cause a surge in output which would affect the chart recorder. Because of this circuit, the head has time to drop onto the plate, and then the power comes on so rapidly that no transients appear on the recorder. When the head is raised, the power goes off before the head ever leaves the plate, again preventing a transient from effecting the recorded data.

The heart of this circuit is a S-C flip-flop formed by two NOR gates 368 and 370. When the head is raised by action of switch 314, the flip-flop are set such that both transistor 372 and transistor 374 are saturated. Saturation of transistor 372 prevents the unijunction oscillator consisting of resistor 378, capacitor 380 and transistor 382 from oscillating. The saturation of transistor 374 prevents output on the emitter of transistor 384 by grounding the gate thereof. The nonconduction of transistor 384 prevents voltage regulator 386 from getting any power from node 388 which is connected to node 284 (FIG. 9) to receive an 18 volt unregulated power input. As long as no power is received by the voltage regulator 386, no output is provided to terminal 390 which is connected to terminal 364 (FIG. 11) to energize voltage regulator 346. When the head is lowered, transistor 372 is immediately cut off and capacitor 380 begins to charge. After a period of one second, a pulse appears across resistor 376 which is effective to change the state of the flip-flop comprised on NOR gates 368 and 370. This change in state causes transistor 374 to cut off and voltage appears at the emitter of transistor 384 which is now effective to drive voltage regulator 386.

Upon raising the head, transistor 374 saturates instantly cutting off the power to voltage regulator 386. Resistors 392 and 394 form a voltage divider to provide the 10 volt regulated output generated at node 390. Resistor 396 limits the short circuit current to 100 milliamperes. Capacitor 398 is for frequency compensation and resistor 400 provides temperature stabilization. Transistor 402 acts as an external pass transistor.

A preferred embodiment of the present invention has been specifically disclosed herein for purposes of illustration. It is apparent that many variations and modifications may be made upon the specific structure disclosed herein. It is intended to cover all of these variations and modifications which fall within the scope of this invention as defined by the appended claims.

We claim:

1. A densitometer for use in quantitative analysis of spots on a thin layer chromographic plate comprising a plate support, a head assembly positioned above said support, said assembly comprising a first source of light and means for sensing light from the plate, a second source of light situated below said support, said support having a frame portion for contacting the outer portion of the plate and an open portion aligned with the spotted areas of the plate such that the spotted areas of the plate may be exposed to light from said second light source.

2. The densitometer of claim 1 wherein said head assembly has an active portion which is movable between an operative position adjacent the plate and an inoperative position relatively remote from the plate.

3. In the densitometer of claim 2, a power supply for said densitometer, and means operatively connected between said power supply and said active portion of said head for moving said active portion from said operative to said inoperative position when the densitometer power is turned off.

4. The densitometer of claim 2 further comprising indicating means operatively connected to said active portion of said head and movable adjacent said plate support for indicating the location of said active portion relative to the spots on the plate.

5. The densitometer of claim 4 wherein said indicating means comprises a pointer mounted on said head assembly adjacent said active portion and extending over the plate support.

6. The densitometer of claim 1 wherein said head assembly comprises a container portion wherein said first light source is located and an active portion wherein light from said first source is directed onto the plate and means for transferring light from said container portion to said active portion, said transferring means comprising a base within which said first light source is situated, a cylindrical cover member having a first opening in one end adapted to receive said base and a second opening in the other end, a fibre optic bundle having a light input end and a light output end, said light input end situated within said second opening and said light output end situated in said active portion of said assembly.

7. The densitometer of claim 6 further comprising means for supporting a filter, said filter support means situated within said cover member between said first and said second opening.

8. The densitometer of claim 1 wherein said plate support further comprises means for releasably engaging the plate such that the plate is secured to said frame portion.

9. The densitometer of claim 8 wherein said engaging means comprises an elongated member rotatably mounted to said frame for movement in a plane perpendicular to the plane of the plate and a bias spring, said spring exerting a force on said member tending to cause said member to rotate to a position such that the plate is secured between said member and said frame.

10. The densitometer of claim 1 further comprising means for indicating the quantity of light detected by said sensing means, said indicating means comprising a meter having a scale and means for controlling the sensitivity of said meter of different portions along said meter scale.

11. The densitometer of claim 10 wherein said sensing means comprises photosensitive signal generating means and wherein said sensitivity controlling means comprises a damping circuit connected between said signal generating means and the meter.

12. The densitometer of claim 11 wherein said meter is a balance meter and wherein said damping circuit comprises two oppositely oriented diodes each of which is connected in parallel with a series circuit comprising a resistor and said meter.

13. The densitometer of claim 2 further comprising means for deactivating said sensing means except when said active portion of said head assembly is in said operational position.

14. The densitometer of claim 13 wherein said deactivating means comprises a capacitor, an output terminal first and second switching devices, first and second voltage sources and a logic circuit, said sensing means being operably connected to said terminal, said capacitor being connected in parallel with the output circuit of said first device, said second source being connected to said terminal, the output circuit of said second device being connected between said terminal and ground, said logic circuit being effective to render both of said devices conductive when said active portion is in said inoperative position thereby preventing activation of said sensing means and to render said first device nonconductive when said active portion is in said operative position, the output circuit of said first device being connected between said first voltage source and ground such that the nonconductivity thereof permits said capacitor to charge to a given voltage, said given voltage being effective to cause said logic circuit to render said second device nonconductive thus permitting said second voltage source to activate said sensing means.

15. The densitometer of claim 14 wherein said logic circuit is a pair of cross-coupled NOR gates.

16. The densitometer of claim 2 further comprising means for moving said active portion between said operative and inoperative positions, said moving means comprising a solenoid having a plunger operably connected to said head assembly and a high voltage transient pulse generating circuit connected to the coil of said solenoid whereby the pulling force of said coil on said plunger is enhanced during the period of initial activation of said solenoid.

17. The densitometer of claim 16 wherein said transient pulse generating circuit comprises a voltage source, a capacitor and a voltage doubler circuit connected between said voltage source and said capacitor for charging same, said capacitor being connected in parallel with said coil when said solenoid is activated to provide a pulse across said coil to initiate movement of said plunger, and means for causing the voltage across said coil to maintain a steady state value sufficient to provide the necessary pull on said plunger to complete movement thereof.

18. The densitometer of claim 17 wherein said active portion is retained in said operative position when said solenoid is activated.

19. The densitometer of claim 18 further comprising balancing means effective to move said active portion to said inoperative position when said solenoid is deactivated.

20. The densitometer of claim 1 wherein said first source of light emits light in the visible range and said second source of light emits light in the ultraviolet range.

21. A densitometer for use in quantitative analysis of spots on a thin layer chromographic plate comprising a plate support, a head assembly positioned above said support, a source of light and means for sensing light from the plate at least one of which is carried by said head assembly, said head assembly being movable between an operative position adjacent the plate and an inoperative position relatively remote from the plate, and means operatively connected between said power supply and said active portion of said head assembly for moving said active portion to said inoperative position when the densitometer power supply is turned off.

22. The densitometer of claim 21 wherein said head assembly comprises a container portion wherein said light source and said sensing means are situated, an active portion wherein light from said source is directed onto the plate and means for transferring light from said container portion to said active portion, said transferring means comprising a base within which said source is situated, a cylindrical cover member having a first opening in one end adapted to receive said base and a second opening in the other end, a fibre optic bundle having a light input end and a light output end, said light input end situated with said second opening and said light output end situated in said active portion of said assembly.

23. The densitometer of claim 21 wherein said plate support further comprises means for releasably engaging the plate such that the plate is secured to said frame portion.

24. The densitometer of claim 21 further comprising means for deactivating said sensing means except when said active portion of said head assembly is in said operational position.

25. The densitometer of claim 22 further comprising means for moving said active portion between said operative and inoperative positions, said moving means comprising a solenoid having a plunger operably connected to said head assembly and a high voltage transient pulse generating circuit connected to the coil of said solenoid whereby the pulling force of said coil on said plunger is enhanced during the period of initial activation of said solenoid.

26. A densitometer for use in quantitative analysis of spots on a thin chromographic plate comprising a plate support, a head assembly positioned above said support, a source of light and means for sensing light from said plate at least one of which is carried by said assembly, means to move said head assembly and said support relative to each other to align the head assembly transversely with respect to the plate and to scan the plate longitudinally, and means operatively connected to said head assembly and movable adjacent said plate support for indicating the transverse location of the assembly relative to the plate, said means comprising a pointer mounted on said assembly and extending over the plate support.

27. The densitometer of claim 26 wherein said head assembly comprises a container portion wherein said light source and said sensing means are situated, an active portion wherein light from said source is directed onto the plate and means for transferring light from said container portion to said active portion, said transferring means comprising a base within which said source is situated, a cylindrical cover member having a first opening in one end adapted to receive said base and a second opening in the other end, a fibre optic bundle having a light input end and a light output end, said light input end situated with said second opening and said light output end situated in said active portion of said assembly.

28. The densitometer of claim 27 wherein said active portion is movable between an operative position adjacent the plate and an inoperative position relatively remote from the plate.

29. In the densitometer of claim 28 wherein said head assembly has an active portion which is movable between an operative position adjacent the plate and an inoperative position relatively remote from the plate.

30. A densitometer for use in quantitative analysis of spots on a thin chromographic plate comprising a plate support, a head assembly positioned above said support, a source of light and means for sensing light from the plate at least one of which is carried by said head assembly, means operatively connected to said sensing means for indicating the quantity of light detected thereby, said indicating means comprising a balance meter having a balance point along scale and means for controlling the sensitivity of said meter to provide a relatively low sensitivity for points on the scale relatively far from said balance point and a peak sensitivity at said balance point.

31. The densitometer of claim 30 wherein said sensing means comprises photosensitive signal generating means and wherein said sensitivity controlling means comprises a damping circuit connected between said signal generating means and said meter.

32. The densitometer of claim 31 wherein said damping circuit comprises two oppositely oriented diodes each of which is connected in parallel with a series circuit comprising a resistor and said meter.

33. The densitometer of claim 32 wherein said head assembly has an active portion which is movable between an operative position adjacent the plate and an inoperative position relatively remote from the plate.

34. The densitometer of claim 33 further comprising means for moving said active portion between said operative and inoperative positions, said moving means comprising a solenoid having a plunger operably connected to said head assembly and a high voltage transient pulse generating circuit connected to the coil of said solenoid whereby the pulling force of said coil on said plunger is enhanced during the period of initial activation of said solenoid.

35. The densitometer of claim 33 further comprising means for deactivating said sensing means except when said active portion of said head assembly is in said operational position.

* * * * *